April 18, 1944.   D. F. BRAWN   2,346,723
TANK CLOSURE
Filed March 13, 1942
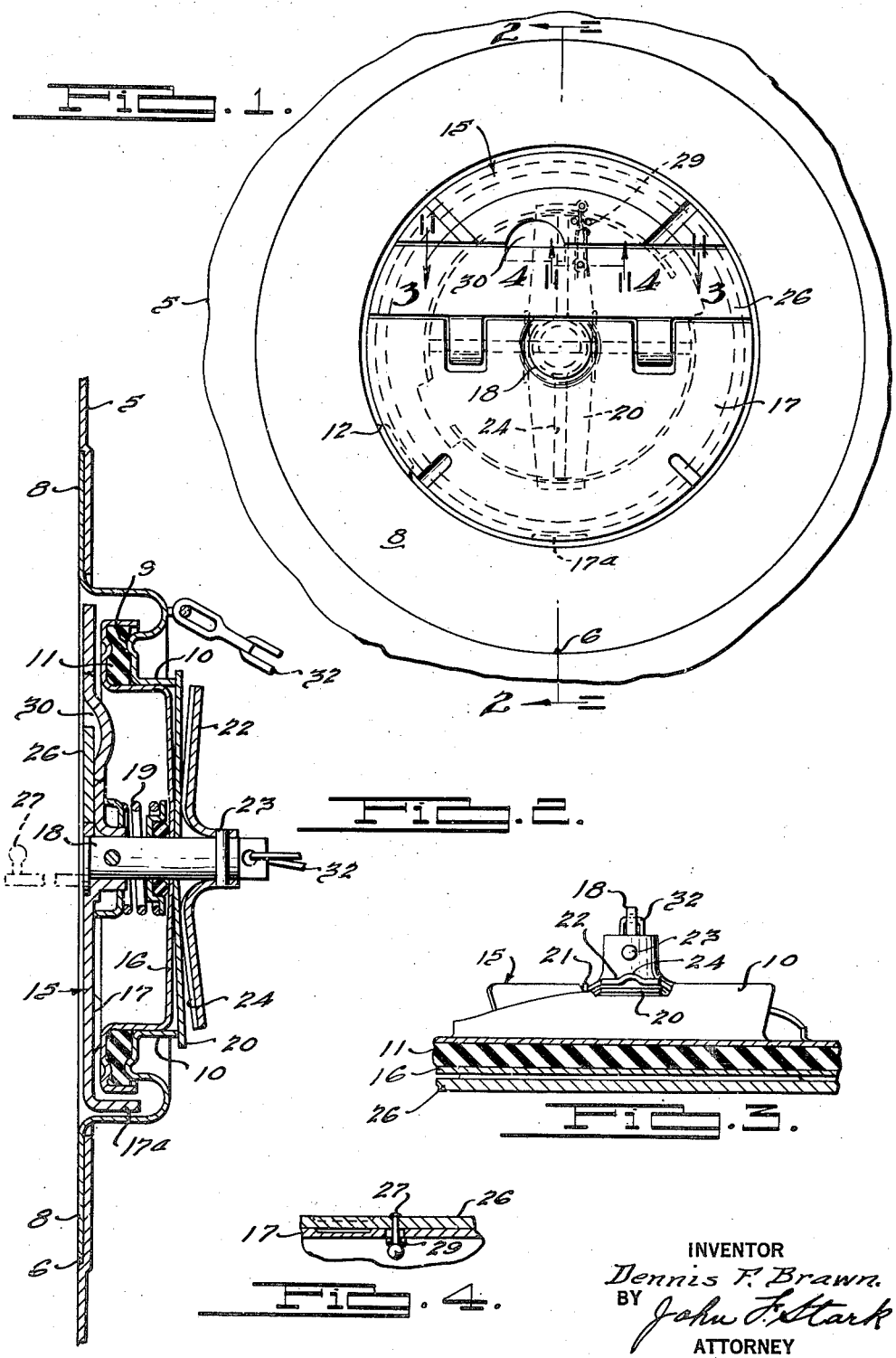
INVENTOR
Dennis F. Brawn.
BY John F. Stark
ATTORNEY Patented Apr. 18, 1944

2,346,723

UNITED STATES PATENT OFFICE 2,346,723

TANK CLOSURE

Dennis F. Brawn, Detroit, Mich., assignor to Eaton Manufacturing Company, Cleveland, Ohio, a corporation of Ohio Application March 13, 1942, Serial No. 434,540

4 Claims. (Cl. 220—44)

This invention relates to closures in general, and, more particularly, concerns a closure for a fuel tank on aircraft.

Heretofore fuel tank closures for aircraft have been acceptable with conventional forms of locking means for securing the cap to the neck or tube of volatile fuel tanks on the aircraft. Various means have also been employed for venting the tank to vacuum or pressure changes to which it may be subjected in use. With the advent of bulletproof fuel tanks, of the so-called self-sealing type, a condition has arisen, for the continued successful use of an airplane so equipped, which has necessitated conception of the novel closure structure comprising the subject matter of the present invention. In an aircraft with a fuel tank of the self-sealing type if the fuel tank is struck or pierced by a bullet a hydraulic ram effect is created by the fuel contents of the tank, especially when the tank is substantially full of fuel. Although the fuel content is protected from loss through the opening caused by the shell, because of the self-sealing properties of the tank in question, the pressures generated in the tank caused by a partial collapse of the tank wall as the shell strikes the same and/or continues through the mass of fuel produces a hydraulic ram effect of very substantial magnitude on the locking means which secures the cap structure to the tank body.

Several cap structures have been devised for fuel tank closures which embody spring pressed means for relieving pressures generated by volatile fluid contents, and which also included a spring-bar locking means for reception under cammed ramps on the neck of the tank body. Such caps however, are not generally acceptable now for use on aircraft having fuel tanks as mentioned because it has been found in actual use, and by simulated tests, that the fuel cap was exploded or blown off from the tank by the hydraulic ram effect of the fuel aforementioned.

The result of losing the cap in flight even though the self-sealing tank remained effective, in view of the fuel tanks being generally located in one or more sections of a wing bay with the tank neck being flush with the upper surface thereof, was to have the fuel remaining in the tank syphoned out by the very material amount of suction or lift of the air stream over the upper surface of the wing in flight. Further, in the event of a subsequent diving or tactical maneuver the fuel was dumped out of the neck of the open topped tank. Additionally in fuel tank caps, heretofore, they were not generally flush with the upper surface of the wing, or if flush, they had hand holds or winged lugs which were acted upon adversely by the advancing air streams. Accordingly, to this end, the present invention incorporates features in its structure completely overcoming the aforementioned objections, including hand hold turning means retractable flush with the upper surface of the aircraft wing which is pressed thereto, and thereby tends to maintain the cap on the tank neck, by reason of the pressure of the air stream advancing thereover.

Among the objects of the present invention is the provision in an aircraft fuel tank closure of means for securing the closure to the tank which obviates loss of the tank contents by blowing off the tank closure; the provision in an aircraft fuel tank closure, as above described, which is located in the upper surface of the wing thereof and is subjected to the air stream passing thereover, which includes retractable means for removal of the closure that is constantly pressed flush to the wing surface in flight by said airstream; the provision in an aircraft fuel tank closure, as above described, including a central stud means for mounting a resilient locking crossbar on the lower end with a predetermined flexing movement ad which includes rigid means to back up or support the resilient locking member against loss of the cap from extraneous abnormal pressures developed in the tank during use.

A further object of the present invention is the provision in a fuel tank closure for aircraft tanks of the bulletproof or self-sealing type, which comprises a substantially rigid, ribbed or reinforced support bar backing up a resilient locking member to prevent loss of the cap through abnormal pressures generated in the tank by a hydraulic ram effect caused by the fuel content on the cap by passage of a bullet into or through the tank, and which also includes spring pressed relief means mounted on the cap, afforded by the resilient locking member and rigid reinforcement bar, to assist in relieving said abnormal tank pressures without loss of additional fuel content; a still further object is the provision in an aircraft fuel tank closure, as above described, and which is to be mounted flush with the upper surface of the wing in an aircraft wing tank, of a retractable hand-hold means for effecting removal of the cap which is so constructed and arranged to be used with cooperable means on the tank neck that in its retracted position it is always facing toward the trailing edge of the wing and is constantly pressed to the upper surface of the wing by the air-stream flowing over the leading edge thereof; the provision in a cap structure, as above described, which includes means for preventing application of the closure structure to the tank neck except in a predetermined angular relation of the retractable hand-hold with respect to the leading edge of the aircraft wing in which it may be mounted.

Further and other objects and advantages of the present invention reside in the novel combination and arrangement of parts about to be described when taken together with the drawing, forming a part of this specification, and, are more particularly set forth and pointed out in the appended claims.

In the drawing like reference characters denote corresponding parts in the several views, and in which:

Fig. 1 is a top plan view of a portion of an aircraft wing surface with one form of a flush type fuel tank closure therein according to the teaching of this invention; and Fig. 2 is a diametrical sectional view through the closure of Fig. 1 taken on the line 2—2 thereof; and Fig. 3 is a sectional view through the closure of Fig. 1, substantially on the line 3—3 thereof, and illustrating at enlarged detail the resilient locking and rigid support or backing up means therefor; and Fig. 4 is a detail on the line 4—4 of Fig. 1 of a resilient locking means to prevent inadvertent opening of the retractable hand hold on the closure.

In the drawing, now having reference to Figs. 1 and 2, there is shown a portion of the upper surface of an aircraft wing, generally designated 5, with the lower notched edge 6 representing the leading edge of the wing and the opposite side the trailing edge of the wing, off which the advancing air stream flows. In the present instance since a bay of the wing has been utilized as a fuel container there is no separate tank structure shown under the wing surface 5, or skin of the ship, simply a recessed circular portion in the surface as shown receives a fixed annular, reversely bent, disc 8 therein which provides a gasket seat 9 and inner bayonet slots or cammed ramps 10 to retain the cap structure proper flush with the upper surface of the wing. Accordingly, the annular disc 8 may be considered to correspond to the neck structure of any conventional fuel tank. A resilient gasket 11 is arranged on the gasket seat 9 to sealingly receive the cap proper, generally designated 15, in liquid tight relation. A lug or stop 12 projecting from the inner periphery of the annular disc 8 restricts complete rotation of the cap to a predetermined angular amount, for a purpose to be described later.

The cap proper generally designated 15 is comprised of a circular cupped or dished member 16 having a reversely bent outer periphery to receive the gasket member 11, and an upper circular multi-recessed cover like member 17, both of which are joined by a central stud 18 extended axially through each of the members and pinned thereto. A finger or arm 17a depending from the cover member 17 is arranged to contact the cooperable lug or stop 12, for a purpose to be described. A coiled spring 19 is compressed a predetermined amount, and maintained by centralizing spring seating means between the members 16 and 17 to produce a sealing action on a rubber ring therebelow for preventing escapement of gas upward along the stud out the top of the cap. Beneath the cup-shaped member 16 is an apertured resilient cross bar of spring metal which is also mounted on the stud 18 and extends beyond the periphery of the overlying dished member 16 a sufficient distance to be received between the slots in the cammed ramps 10 and be locked thereunder when the cap is angularly rotated to a locking position and thereby provide a desired degree of resistance to normal pressure relief.

The cap so far described is subject to be blown off by abnormal pressures generated in the fuel tank under the influence of the hydraulic ram effect on the fuel content therein caused by a bullet striking or piercing the tank, as aforementioned, because of the resiliency inherently necessary to be designed in the spring metal cross bar 20 to effect placement and removal of the cap 15 on the neck in the usual manner. Of course, it is clear that the spring cross bar 20 has enough resilience to afford a desired resistance to permit venting the tank of normal pressures generated therein. However, under the abnormal pressure conditions generated in the fuel tank by the shell or gun fire as disclosed, it is not possible to provide the resistance necessary to vent normal pressures in the tank and the resiliency required for application of hand force in securing the cap to the neck in the spring cross bar 20 for any or all pressure conditions that may be encountered in service; accordingly, a substantially rigid centrally apertured support bar 22 is mounted below the spring locking bar 20, also on the stud 18 and retained thereon by means of a tapered pin 23. The opposite outer ends of the support bar 22 are bent downwardly away from the overlying ends of the spring locking bar 20, to give it a desired degree of freedom of movement before being stopped, and may be reinforced by a rib or web 24 extended throughout the longitudinal length thereof. A pair of arms 21 are bent up from the opposite sides of the spring bar 20 to keep it aligned with the support bar 22, although any other equivalent aligning means may be employed. The reinforcing or support bar may also be added to existing closures of the same general structure to convert them into closures utilizing the teaching of the present invention.

To effect placement and removal of the closure a hinged hand-hold bar 26 may be extended normal to the cap body or retracted flush into the face of the multi-recessed cover member 17. In its retracted or flush position the cover 17 is held against rattling or inadvertent opening, in inverted or diving maneuvers of the plane by means of a headed stud portion 27 which is received tensionally between a wire-like spring eye 29 secured in surrounding relation beneath an aperture to the underside of the cover member 17, as best shown in Fig. 4. A thumb recess 30 adjacent the marginal edge of the hand-hold bar 26 provides access for the operator when the finger is used as a lever to pry the hand-hold from its locked condition by the stud 27 in a flush position with the upper wing surface into an open position normal to the cap body. A link chain 32 may be secured at one end to the lower edge of the stud 18 and have its other end secured to the tank neck disc 8 to prevent loss or displacement of the cap from the immediate vicinity thereof.

The mode of operation and functions of the various component parts of the closure when applied to the neck disc 8 are as follows: The hand hold bar 26 is extended from its retracted position flush in the cover member 17 and the cap applied in predetermined angular position to the neck disc 8 so the resilient locking bar and its lower support or reinforcing bar 22 may be lowered through the bayonet slots in the neck disc and rotated under the cammed ramps 10 into locked position at the rests on the ends of the cams. The correct positions to effect locking is determined by the finger 17a and the cooperating lug or stop 12 on the neck disc, and is so arranged as to permit reception and angular rotation of the cap into locked position in only one way, so that the extended hand-hold bar 26, when the cap is in locked position, faces toward the trailing edge of the wing surface. The hand-hold bar is then retracted and tensionally locked flush into the wing surface by the wire spring eye 29. In this position it will be apparent pressure of the advancing air stream flowing over the leading edge of the wing toward the trailing edge will always tend to press the bar 26 tightly to the upper surface of the wing. Also in this locked position, upon development of the hydraulic ram effect under the conditions aforementioned, the cap 15 will be initially lifted by pressure on the bottom surface area of the dished member 16 against the resilient locking bar 20 to partially vent the abnormal pressure to the atmosphere. Excess movement of the cap is accommodated by bending of the resilient locking bar 20 to vent partial normal tank pressure until it gives an amount sufficient to back it up against the rigid reinforcement support bar 22 when further outward movement of the cap is stopped and the pressure relieved until the cap is again seated by reversal of the functions mentioned.

From the foregoing disclosures it will be apparent there has been revealed a novel aircraft fuel tank closure embodying, among other things, the objects and advantages of the invention first enumerated. It is not intended to be limited to a flush type tank closure as the invention could be applied equally well to other neck structures to overcome the hydraulic ram effect in bulletproof fuel tanks. The specific embodiment of the invention is by way of illustration only and the scope of the invention is to be interpreted by the spirit and substance of the following claims.

What I claim is:

1. An aircraft fuel tank closure which may be subjected to abnormal pressures in use through the fuel content thereof, said closure comprising in combination a cap body, a stud depending centrally of the cap, a resilient cross bar non-rotatably mounted on the lower end of the stud adapted to yield under the application of a hand force in securing the cap in locking engagement with the fuel tank and providing release of partial pressures generated in said tank while affording negligible resistance to abnormal pressures which may be generated therein, and a rigid reinforcement cross bar also non-rotatably mounted on the stud below the resilient locking cross bar and longitudinally alined therewith but spaced therefrom at its outer extremities to support the resilient cross bar after predetermined deflection under the effect of partial pressures in said tank short of releasing engagement from the tank by said abnormal pressures generated therein.

2. An aircraft fuel tank closure which may be subjected to abnormal pressures in use through the fuel content thereof, said closure comprising in combination a cap body, a stud depending centrally of the cap, a resilient cross bar non-rotatably mounted on the lower end of the stud adapted to yield under the application of a hand force in securing the cap in locking engagement with the fuel tank and providing release of partial pressures generated in said tank while affording negligible resistance to abnormal pressures which may be generated therein, a rigid reinforcement cross bar also non-rotatably mounted on the stud below the resilient locking cross bar and longitudinally alined therewith but spaced therefrom at its outer extremities to support the resilient cross bar after predetermined deflection under the effect of partial pressures in said tank short of releasing engagement from the tank by said abnormal pressures generated therein, and said reinforcement cross bar comprising a member cambered longitudinally of its length and having a central stiffening web or rib extending throughout the longitudinal length thereof.

3. An aircraft fuel tank closure which may be subjected to abnormal pressures in use through the fuel content thereof, said closure comprising in combination a cap body, a stud depending centrally of the cap, a resilient cross bar non-rotatably mounted on the lower end of the stud adapted to yield under the application of a hand force in securing the cap in locking engagement with the fuel tank and providing release of partial pressures generated in said tank while affording negligible resistance to abnormal pressures which may be generated therein, a rigid reinforcement cross bar also non-rotatably mounted on the stud below the resilient locking cross bar and longitudinally alined therewith but spaced therefrom at its outer extremities to support the resilient cross bar after predetermined deflection under the effect of partial pressures in said tank short of releasing engagement from the tank by said abnormal pressures generated therein, said reinforcement cross bar comprising a member cambered longitudinally of its length and having a central stiffening web or rib extending throughout the longitudinal length thereof, and said resilient locking bar including means centrally thereof for maintaining the underlying reinforcement cross bar in alignment therewith on its longitudinally cambered length.

4. As a new article of manufacture for use on aircraft a fuel tank closure having a dependent central stud with a lower resilient locking cross bar thereon of the type described that may be employed on frangible self-sealing fuel tanks, to counteract abnormal pressure effects of the hydraulic ram produced on the fuel content thereof, and a centrally apertured reinforcement bar bowed in its longitudinal dimension with a stiffening mid-rib extended longitudinally thereof, said reinforcement bar adapted to be mounted through its central aperture on the depending central stud of said closure below the resilient locking cross bar thereon and fixed in longitudinal alignment therewith to reinforce the same for limited deflection and pressure relief under said abnormal pressure effects.

DENNIS F. BRAWN.